United States Patent
Al-Dhahir et al.

(10) Patent No.: US 7,154,964 B1
(45) Date of Patent: Dec. 26, 2006

(54) CREATING TRAINING SEQUENCES FOR SPACE-TIME DIVERSITY ARRANGEMENTS

(75) Inventors: Naofal Al-Dhahir, Chatham, NJ (US); Christine Fragouli, Madison, NJ (US); William Turin, East Brunswick, NJ (US)

(73) Assignee: AT&T Corp., New York, NY (US)

( * ) Notice: Subject to any disclaimer, the term of this patent is extended or adjusted under 35 U.S.C. 154(b) by 836 days.

(21) Appl. No.: 09/957,293

(22) Filed: Sep. 20, 2001

Related U.S. Application Data (60) Provisional application No. 60/282,647, filed on Apr. 9, 2001.

(51) Int. Cl.
  *H04L 27/04* (2006.01)
(52) U.S. Cl. ............ 375/299; 375/260; 375/231; 375/341; 375/347
(58) Field of Classification Search ........ 375/279, 375/299, 308, 267, 232, 343, 231, 260, 361, 375/347; 332/103; 341/173–174, 180; 455/101, 455/103, 403; 370/292; 379/100.17
  See application file for complete search history.

(56) References Cited

U.S. PATENT DOCUMENTS

| | | | | |
|---|---|---|---|---|
| 5,455,844 | A * | 10/1995 | Ishikawa et al. | 375/232 |
| 6,735,258 | B1 * | 5/2004 | Trott et al. | 375/308 |
| 2001/0036235 | A1 * | 11/2001 | Kadous | 375/341 |

FOREIGN PATENT DOCUMENTS

GB   1187410 A1 *   3/2001

OTHER PUBLICATIONS

Wai Ho Mow, 1996, "A new Unified Construction of Perfect Root-of-Unity Sequence", IEEE Spread Spectrum Techniques and Applications Proceedings, 3:955-959.*
Tarokh et al., "On the Computation and Reduction of the Peak-to-Average Power Ratio in Multicarrier Communications", IEEE Transactions on Communications, vol. 48, No. 1, Jan. 2000.*
E Lindskog et al, A Transmit Diversity Scheme for Channels With Intersymbol Interference, ICC, 1:307-311, 2000.

* cited by examiner

*Primary Examiner*—Jean B. Corrielus
*Assistant Examiner*—Edith Chang
(74) *Attorney, Agent, or Firm*—Henry T. Brendzel (57) ABSTRACT

A training sequence is created for space-time diversity arrangement, having any training sequence length, while limiting the training sequence to a standard constellation. Given a number of channel unknowns that need to be estimated, L, a training sequence can be creates that yields minimum means squared estimation error for lengths $N_t = kN_{PRUS} + L - 1$, for any positive integer $k \geq 1$, where $N_{PRUS}$ is a selected perfect roots-of-unity sequence (PRUS) of length N. The training sequence is created by concatenating k of the length N perfect roots-of-unity sequences, followed by L−1 initial symbols of that same PRUS. Good training sequences can be created for lengths $N_t$ that cannot be obtained through the above method by concatenating a requisite number of symbols found through an exhaustive search.

9 Claims, 4 Drawing Sheets

CREATING TRAINING SEQUENCES FOR SPACE-TIME DIVERSITY ARRANGEMENTS

RELATED APPLICATION

This invention claims priority from provisional application No. 60/282,647, filed Apr. 9, 2001.

BACKGROUND OF THE INVENTION

This relates to space-time coding, and more particularly, to channel estimation in space-time coding arrangements.

Space-Time coding (STC) is a powerful wireless transmission technology that enables joint optimized designs of modulation, coding, and transmit diversity modules on wireless links. A key feature of STC is that channel knowledge is not required at the transmitter. While several non-coherent STC schemes have been invented that also do not require channel information at the receiver, they suffer performance penalties relative to coherent techniques. Such non-coherent techniques are therefore more suitable for rapidly fading channels that experience significant variation with the transmission block. However, for quasi static or slowly varying fading channels, training-based channel estimation at the receiver is commonly employed, because it offers better performance.

For single transmit antenna situations, it is known that a training sequence can be constructed that achieves a channel estimation with minimum mean squared error (optimal sequences) by selecting symbols from an $N^{th}$ root-of-unit alphabet of symbols $$e^{\frac{i2\pi k}{N}}$$

k=0, 1, 2, ... (N−1), when the alphabet size N is not constrained. Such sequences are the Perfect Roots-of-Unity Sequences (PRUS) that have been proposed in the literature, for example, by W. H. Mow, "Sequence Design for Spread Spectrum," *The Chinese University Press, Chinese University of Hong Kong,* 1995. The training sequence length, $N_t$, determines the smallest possible alphabet size. Indeed, it has been shown that for any given length $N_t$, there exists a PRUS with alphabet size $N=2 N_t$, and that for some values of $N_t$ smaller alphabet sizes are possible. It follows that a PRUS of a predetermined length might employ a constellation that is other than a "standard" constellation, where a "standard" constellation is one that has a power of 2 number of symbols. Binary phase shift keying (BPSK), quadrature phase shift keying (QPSK), and 8-point phase shift keying (8-PSK) are examples of a standard constellation. Most, if not all, STC systems employ standard constellations for the transmission of information.

Another known approach for creating training sequences constrains the raining sequence symbols to a specific (standard) constellation, typically, BPSK, QPSK, or 38-PSK in order that the transmitter and receiver implementations would be simpler (a single mapper in the transmitter and an inverse mapper in the receiver—rather than two). In such a case, however, optimal sequences do not exist for all training lengths $N_t$. Instead, exhaustive searches must be carried out to identify sub-optimal sequences according to some performance criteria. Alas, such searches may be computationally prohibitive. For example, in the third generation TDMA proposal that is considered by the industry, 8-PSK constellation symbols are transmitted in a block that includes 116 information symbols, and 26 training symbols ($N_t$=26). No optimal training sequence exists for this value of $N_t$ and constellation size and number of channel taps to estimate, L.

Figure 1:
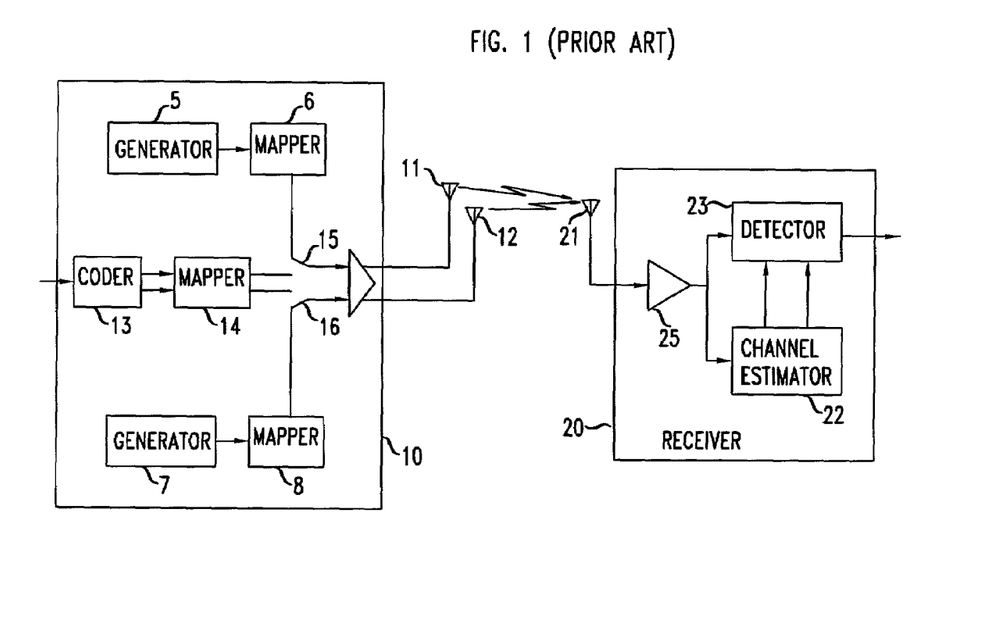
FIG. 1 shows a prior art arrangement of a two-antenna transmitter and a one antenna receiver, where training sequences are independently generated for the two transmitting antennas.

When, for example, two transmit antennas are employed, a training sequence is needed for each antenna, and ideally, the sequences should be uncorrelated. One known way to arrive at such sequences is through an exhaustive search in the sequences space. This space can be quite large. For example, when employing two antennas, and a training sequence of 26 symbols for each antenna, this space contains $8^{2 \times 26}$ sequences. For current computational technology, this is a prohibitively large space for exhaustive searching. Reducing the constellation of the training sequence to BPSK (from 8-PSK) reduces the search to $2^{2 \times 26}$ sequences, but that is still quite prohibitively large; and the reduction to a BPSK sequence would increase the achievable mean squared error. Moreover, once the two uncorrelated sequences are found, a generator is necessary for each of the sequences, resulting in an arrangement (for a two antenna case) as shown in FIG. 1, which includes transmitter 10 that includes information encoder 13 that feeds constellation mapper 14 that drives antennas 11 and 12 via switches 15 and 16. To provide training sequences, transmitter 10 includes sequence generator 5 followed by constellation mapper 6 that feeds antenna 11 via switch 15, and sequence generator 7

SUMMARY OF THE INVENTION

An advance in the art is achieved with an approach that recognizes that a training sequence can be created for any training sequence length, while limiting the training sequence to a standard constellation. Specifically, given a number of channel unknowns that need to be estimated, L, a training sequence can be creates that yields minimum means squared estimation error for lengths $N_t = kN_{PRUS} + L - 1$, for any positive integer $k \geq 1$, where $N_{PRUS}$ is a selected perfect roots-of-unity sequence (PRUS) of length N, that is smaller than $N_t$. The training sequence is created by concatenating k of the length N perfect roots-of-unity sequences, followed by L−1 initial symbols of that same PRUS. Alternatively, k+1 instances of the selected PRUS can be concatenated, followed by a dropping of symbols in excess of $N_t$. Good training sequences can be created for lengths $N_t$ that cannot be obtained through the above method by concatenating a requisite number of symbols found through an exhaustive search. That is, such lengths can be expressed by $N_t = kN_{PRUS} + L - 1 + M$, where k and $N_{PRUS}$ are chosen to yield a minimum M.

DETAILED DESCRIPTION

The following mathematical development focuses on a system having two transmit antennas and one receive antenna. It should be understood, however, that a skilled artisan could easily extend this mathematical development to more than two transmit antennas, and to more than one receive antenna.

Figure 2:
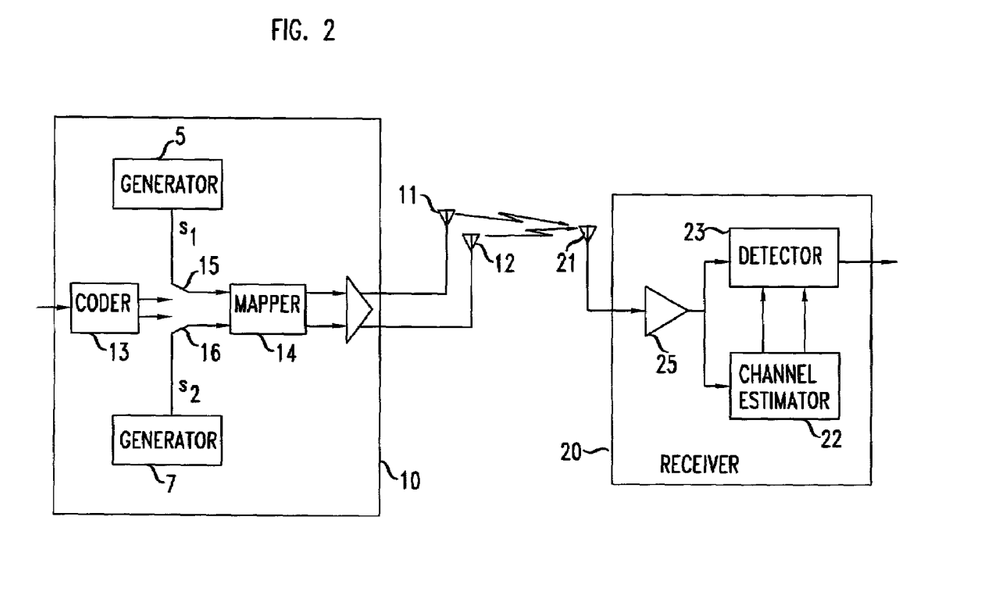
FIG. 2 shows an arrangement where the training sequences employ the same constellation mapper that is employed in mapping space-time encoded information symbols.

FIG. 2 shows an arrangement a transmitter with two transmit antennas 11 and 12 that transmits signals $s_1$ and $s_2$, respectively, and a receiver with receive antenna 21, and channels $h_1$ (from antenna 11 to antenna 21) and $h_2$ (from antenna 12 to antenna 21) therebetween. Channels $h_1$ and $h_2$ can be expressed as a finite impulse response (FIR) filter with L taps. Thus, the signal received at antenna 21 at time k, y(k), can be expressed as $$y(k) = \sum_{i=0}^{L-1} h_1(i)s_1(k-i) + \sum_{i=0}^{L-1} h_2(i)s_2(k-i) + z(k) \quad (1)$$

where z(k) is noise, which is assumed to be AWGN (additive white Gaussian noise).

The inputs sequences $s_1$ and $s_2$ belong to a finite signals constellation and can be assumed, without loss of generality, that they are transmitted in data blocks that consist of $N_t$ information symbols and $N_t$ training symbols. If $N_t$ training symbols are employed to estimate the L taps of a channel in the case of a single antenna, then for a two antenna case such as shown in FIG. 1, one needs to employ $2N_t$ training symbols to estimate the 2L unknown coefficients (of $h_1$ and $h_2$).

When a training sequence of length $N_t$ is transmitted, the first L received signals are corrupted by the preceding symbols. Therefore, the useful portion of the transmitted $N_t$ sequence is from L to $N_t$. Expressing equation (2) in matrix notation over the useful portion of a transmitted training sequence yields $$y = Sh + z = [S_1(L, N_t)S_2(L, N_t)]\begin{bmatrix} h_1(L) \\ h_2(L) \end{bmatrix} + z, \quad (2)$$

where y and z are vectors with ($N_t$−L+1) elements, $S_1(L, N_t)$ and $S_2(L, N_t)$ are convolution matrices of dimension ($N_t$−L+1)×L, and $h_1(L)$ and $h_2(L)$ are of dimension L×1; that is, $$S_l(L, N_t) = \begin{bmatrix} s_l(L-1) & s_l(L-2) & \cdots & s_l(0) \\ s_l(L) & s_l(L-1) & \cdots & s_l(1) \\ \vdots & \vdots & \ddots & \vdots \\ s_l(N_t-1) & s_l(N_t-2) & \cdots & s_l(N_t-1L) \end{bmatrix}, \quad (3)$$

and $$h_l(L) = \begin{bmatrix} h_l(0) \\ h_l(1) \\ \vdots \\ h_l(L-1) \end{bmatrix} \text{ for } i = 1, 2. \quad (4)$$

If the convolution matrix is to have at least L rows, $N_t$ must be at least 2L−1. In the context of this disclosure, the S matrix is termed the "training matrix" and, as indicated above, it is a convolution matrix that relates to signals received from solely in response to training sequence symbols; i.e., not corrupted by signals sent prior to the sending of the training sequence.

The linear least squared channel estimates, ĥ, assuming S has full column rank, is $$\hat{h} = \begin{bmatrix} \hat{h}_1 \\ \hat{h}_2 \end{bmatrix} = (S^H S)^{-1} S^H y, \quad (5)$$

where the $(\bullet)^H$ and $(\bullet)^{-1}$ designate the complex-conjugate transpose (Hermitian) and the inverse, respectively. For zero mean noise, the channel estimation mean squared error is defined by $$MSE = E[(h-\hat{h})^H(h-\hat{h})] = 2\sigma^2 tr((S^H S)^{-1}), \quad (6)$$

where tr(.) denotes a trace of a matrix. The minimum MSE, MMSE, is equal to $$MMSE = \frac{2\sigma^2 L}{(N_t - L + 1)}, \quad (7)$$

which is achieved if and only if $$S^H S = \begin{bmatrix} S_1^H S_1 & S_2^H S_1 \\ S_1^H S_2 & S_2^H S_2 \end{bmatrix} = (N_t - L + 1) I_{2L} \quad (8)$$

where $I_{2L}$ is the 2L×2L identity matrix. The sequences $s_1$ and $s_2$ that satisfy equation (8) are optimal sequences. Equation (8) effectively states that the optimal sequences have an impulse-like autocorrelation function (e.g. $S_1^H S$ corresponds to the identity matrix, I, multiplied by a scalar) and zero cross-correlations.

A straightforward approach for designing two training sequences of length $N_t$ each is to estimates two L-taps channels (i.e., two channels having L unknowns each, or a total of 2L unknowns) is to design a single training sequence s of length $N'_t$ ($N'_t = N_t + L$) that estimates a single channel with L'=2L taps (i.e., a single channel having 2L unknowns).

Figure 3:
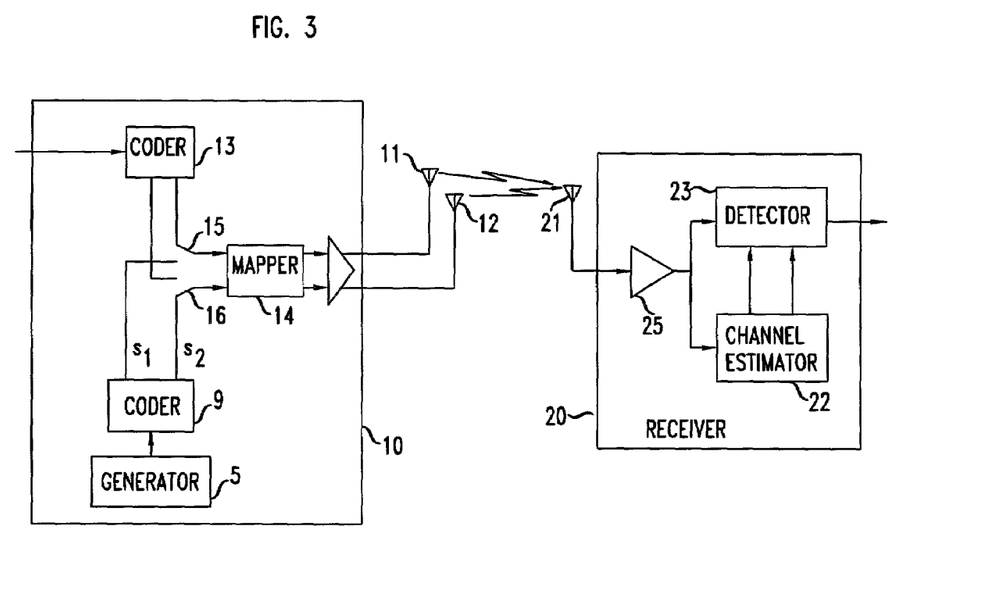
FIG. 3 presents a block diagram of an arrangement where a single encoder generates the training sequences for the two transmitter antennas.

Generalizing, $N'_t = N_t + (n-2)L$, where n is the number of antennas. One can thus view the received signal as $$y = S(L', N'_t)h(L') + z \quad (9)$$

where S is a convolution matrix of dimension $(N'_t - L' + 1) \times L'$. Again, for optimality, the imposed requirement is that $$S^H(L', N'_t)S(L', N'_t) = (N'_t - L' + 1)I_{2L}, \quad (10)$$

and once the sequence s is found, the task is to create the subsequences $s_1$ and $s_2$ from the found sequence s. Preferably, the subsequences $s_1$ and $s_2$ can be algorithmically generated from sequence s. Conversely, one may find subsequences $s_1$ and $s_2$ that satisfy the requirements of equation (8) and be such that sequence s can be algorithmically generated. This permits the use of a single training signal generator that, through a predetermined algorithm (i.e., coding) develops the subsequences $s_1$ and $s_2$. Both approaches lead to embodiment depicted in FIG. 3, where information signals are applied to encoder 13 that generates two streams of symbols that are applied to constellation mapper 14 via switches 15 and 16. Generator 5 creates a training sequence that is applied to encoder 9, and encoder 9 generates the subsequences $s_1$ and $s_2$ that are applied to constellation mapper 14 via switches 15 and 16.

Actually, once we realized that the complexity of the training sequence determination problem can be reduced by focusing on the creation of a single sequence from which a plurality of sequences that meet the requirements of equation (8) can be generated, it became apparent that there is no requirement for s to be longer than $s_1$ and $s_2$.

Figure 4:
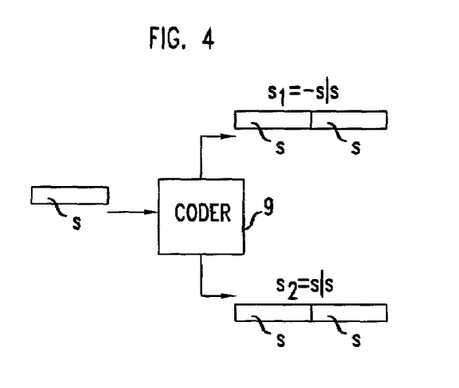
FIG. 4 shows one encoding realization for encoder 9 of FIG. 3.

FIG. 4 presents one approach for generating optimal subsequences $s_1$ and $s_2$ that meet the requirements of equation (8) and that can be generated from a single sequence. In accordance with FIG. 4, generator 5 develops a sequence s of length $N_t/2$, and encoder 9 develops therefrom the sequences $s_1 = -s|s$ and $s_2 = s|s$, where the "|" symbol stands for concatenation; e.g., sequence $s_1$ comprises sequence $-s$ concatenated with, or followed by, sequence s. Thus, during the training sequence, antenna 11 transmits the sequence $-s$ during the first $N_t/2$ time periods, and the sequence s during the last $N_t/2$ time periods. Antenna 12 transmits the sequence s during both the first and last $N_t/2$ time periods.

In response to the training sequences transmitted by antennas 11 and 12, receiving antenna 21 develops the signal vector y (where the elements of the vector y are the signals received from antennas 11 and 12). Considering the received signal during the first $N_t/2$ time periods as $y_1$ and during the last $N_t/2$ time periods as $y_2$, and employing only the useful portion of the signal (that is, the portions not corrupted by signals that are not part of the training sequence) one gets $$\begin{bmatrix} y_1 \\ y_2 \end{bmatrix} = \begin{bmatrix} -S & S \\ S & S \end{bmatrix} \begin{bmatrix} h_1 \\ h_2 \end{bmatrix} + \begin{bmatrix} z_1 \\ z_2 \end{bmatrix} \quad (11)$$

where S is a convolution matrix of dimension $(N_t - L + 1) \times L$. In accordance with the principles disclosed herein, the FIG. 3 receiver multiplies the received signal in processor 25 with the transpose conjugate matrix $S^H$, yielding $$\begin{bmatrix} r_1 \\ r_2 \end{bmatrix} = \begin{bmatrix} -S^H & S^H \\ S^H & S^H \end{bmatrix} \begin{bmatrix} y_1 \\ y_2 \end{bmatrix} = \begin{bmatrix} 2S^H S & 0 \\ 0 & 2S^H S \end{bmatrix} \begin{bmatrix} h_1 \\ h_2 \end{bmatrix} + \begin{bmatrix} \bar{z}_1 \\ \bar{z}_2 \end{bmatrix} \quad (12)$$

where $$\begin{bmatrix} \bar{z}_1 \\ \bar{z}_2 \end{bmatrix} = \begin{bmatrix} -S^H & S^H \\ S^H & S^H \end{bmatrix} \begin{bmatrix} z_1 \\ z_2 \end{bmatrix}. \quad (13)$$

If the sequence s is such that $S^H S = (N_t - L + 1)I_L$, then $$\begin{bmatrix} r_1 \\ r_2 \end{bmatrix} = 2(N_t - L + 1)\begin{bmatrix} h_1 \\ h_2 \end{bmatrix} + \begin{bmatrix} \bar{z}_1 \\ \bar{z}_2 \end{bmatrix}. \quad (14)$$

If the noise is white, then the linear processing at the receiver does not color it, and the channel transfer functions correspond to $$h_1 = 1/2(N_t - L + 1)r_1$$

$$h_2 = 1/2(N_t - L + 1)r_2 \quad (15)$$

with a minimum squared error, MSE, that achieves the lower bound expressed in equation (7); to wit, $$MSE = \frac{2\sigma^2 L}{(N_t - L + 1)}. \quad (16)$$

The above result an be generalized to allow any matrix U to be used to encode the training sequence, $s_2$, so that $$\begin{bmatrix} y_1 \\ y_2 \end{bmatrix} = U\begin{bmatrix} h_1 \\ h_2 \end{bmatrix} + \begin{bmatrix} z_1 \\ z_2 \end{bmatrix} \quad (17)$$

as long as $U^H U = 2I$ for a two antennas case, and $U^H U = KI$ for an K antenna case.

Figure 5:
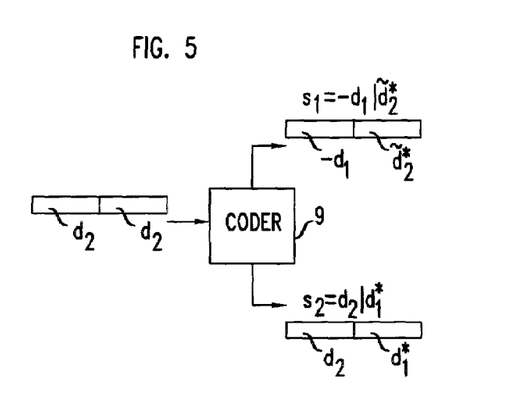
FIG. 5 shows another encoding realization for encoder 9 of FIG. 3.

Whereas FIG. 4 presents a method for developing sequences $s_1$ and $s_2$ of length $N_t$ from a sequence s that is $N_t/2$ symbols long, FIG. 5 presents a method for developing sequences $s_1$ and $s_2$ of length $N_t$ from a sequence s that is $2N_t$ symbols long, which consists of a sequence $d_1 = [s(0)\ s(1)\ \ldots\ s(N_t - 1)]$ followed by a sequence $d_2 = [s(0)\ s(1)\ \ldots\ s(N_t - 1)]$. In accordance with this approach, $s_1 = d_1|-\tilde{d}_2^*$ and $s_2 = d_2|\tilde{d}_1^*$. The sequence $\tilde{d}_1$ corresponds to the sequence $d_1$ with its elements in reverse order. The symbol $\tilde{d}_1^*$ operation corresponds to the sequence $d_1$ with its elements in reverse order and converted to their respective complex conjugates.

Figure 6:
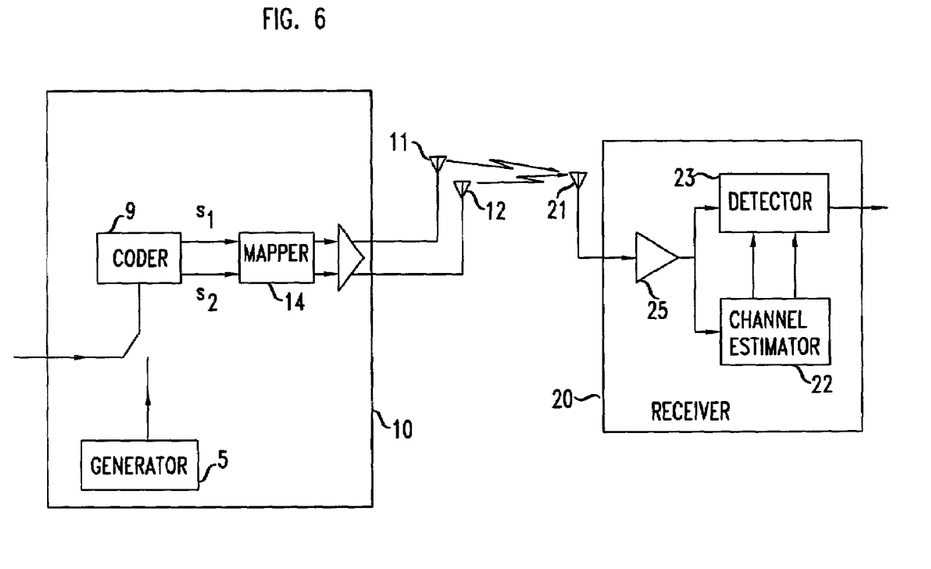
FIG. 6 presents a block diagram of an arrangement where a single encoder generates both the training sequences and the information symbols for the two transmitter antennas.

The FIG. 5 encoding is very similar to the encoding scheme disclosed by Alamouti in U.S. Pat. No. 6,185,258, issued Feb. 6, 2001, except that (a) the Alamouti scheme is symbols-centric whereas the FIG. 5 encoding is sequence-centric, and (b) the Alamouti scheme does not have the concept of a reverse order of a sequence (e.g., $\tilde{d}_1^*$). See also E. Lindskog and A. Paulraj titled "A Transmit Diversity Scheme for Channels With Intersymbol Interference," *ICC*, 1:307–311, 2000. An encoder 9 that is created for developing training sequences $s_1$ and $s_2$ in accordance with FIG. 5, can be constructed with a control terminal that is set to 1 during transmission of information and set to another value (e.g., 0, or to $N_t$ to indicate the length of the generated block) during transmission of the training sequence, leading to the simplified transmitter realization shown in FIG. 6. More importantly, such an arrangement leads to a simplified receiver because essentially the same decoder is used for both the information signals and the training signals.

With a signal arrangement as shown in FIG. 5, the signal captured at antenna 21 of receiver 20 is $$\begin{bmatrix} y_1 \\ y_2 \end{bmatrix} = \begin{bmatrix} -\tilde{D}_2^* & \tilde{D}_1^* \\ D_1 & D_2 \end{bmatrix} \begin{bmatrix} h_1 \\ h_2 \end{bmatrix} + \begin{bmatrix} z_1 \\ z_2 \end{bmatrix} \quad (18)$$

where the matrices $D_i$ and $\tilde{D}_i$ (for i=1,2) are convolution matrices for $d_1$ and $\tilde{d}_1$, respectively, of dimension $(N_t-L+1)\times L$. Recalling from equation (8) that MMSE is achieved if and only if $D^H D$ has zeros off the diagonal; i.e., $$-\tilde{D}_1^T \tilde{D}_2^* + (D_2^*)^T D_1 = 0 \quad (19)$$

and $$-\tilde{D}_2^T \tilde{D}_1^* + (D_1^*)^T D_2 = 0, \quad (20)$$

and identity matrices on the diagonal; i.e., $$\tilde{D}_2^T \tilde{D}_2^* + (D_1^*)^T D_1 = 2(N_t-L+1)I_L \quad (21)$$

and $$\tilde{D}_1^T \tilde{D}_1^* + (D_2^*)^T D_2 = 2(N_t-L+1)I_L. \quad (22)$$

Various arrangements that interrelate sequences $d_1$ and $d_2$ can be found that meet the above requirement. By way of example (and not by way of limitation), a number of simple choices satisfy these conditions follow.

Figure 7:
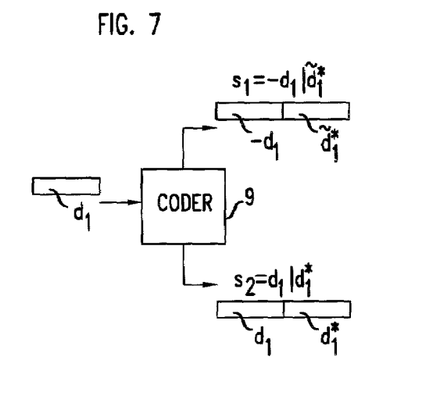
FIG. 7 shows one encoding realization for encoder 9 of FIG. 6.

(1) $(D_1^*)^T D_2 = (N_t-L+1)I_L$, $\tilde{D}_1 = D_1$, and $D_2 = D_1$. To show that equation (21) holds, one may note that $\tilde{D}_2^T \tilde{D}_2^*$ (the first term in the equation) becomes $D_1^T D_1^*$, but if $(D_1^*)^T D_1$ is a diagonal matrix then so is $\tilde{D}_2^T \tilde{D}_2^*$. Thus, according to this training sequence embodiment, one needs to only identify a sequence $d_1$ that is symmetric about its center, with an impulse-like autocorrelation function, and set $d_2$ equal to $d_1$. This is shown in FIG. 7.

Figure 8:
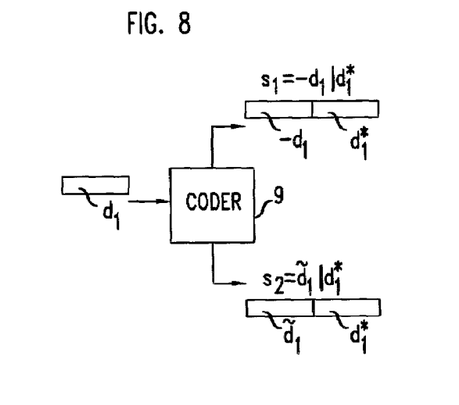
FIG. 8 shows another encoding realization for encoder 9 of FIG. 6.

(2) $(D_1^*)^T D_1 = (N_t-L+1)I_L$, and $\tilde{D}_2 = D_1$. To show that equation (21) holds, one may note that the $\tilde{D}_2^T \tilde{D}_2^*$ first term in the equation also becomes $D_1^T D_1^*$. Thus, according to this training sequence embodiment, one needs to only identify a sequence $d_1$ with an impulse-like autocorrelation function, and set $d_2$ equal to $\tilde{d}_1$. This is shown in FIG. 8.

Figure 9:
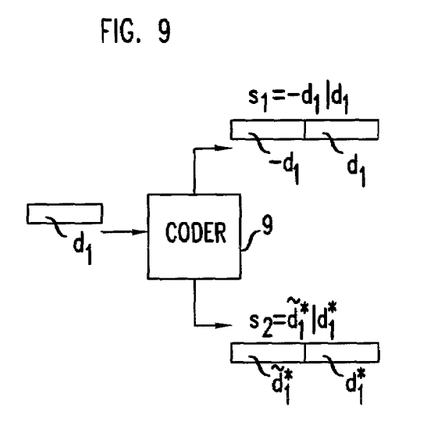
FIG. 9 shows yet another encoding realization for encoder 9 of FIG. 6.

(3) $(D_1^*)^T D_1 = (N_t-L+1)I_L$, and $\tilde{D}_2^* = D_1$. To show that equation (21) holds, one may note that the $\tilde{D}_2^T \tilde{D}_2^*$ first term in the equation becomes $(D_1^*)^T D_1$. Thus, according to this training sequence embodiment, one needs to only identify a sequence $d_1$ with an impulse-like autocorrelation function, and set $d_2$ equal to $\tilde{d}_1^*$. This is shown in FIG. 9.

Training Sequences Employing Trellis Coding

Consider a trellis code with m memory elements and outputs from a constellation of size C, over a single channel with memory $2^m C^{(L-1)}-1$. To perform joint equalization and decoding one needs a product trellis with $2^m C^{(L-1)}$ states. For a space-time trellis code with m memory elements, n transmit antennas and one receive antenna, over a channel with memory (L−1), one needs a product trellis with $2^m C^{n(L-1)}$.

The receiver can incorporate the space-time trellis code structure in the channel model to create an equivalent single-input, single output channel, $h_{eq}$, of length m+L. The trellis, in such a case, involves $C^{(m+L-1)}$ states. The approach disclosed herein uses a single training sequence at the input of the space-time trellis encoder to directly estimate $h_{eq}$ used by the joint space-time equalizer/decoder. The channel $h_{eq}$ that incorporates the space-time code structure typically has a longer memory than the channel $h_1$ and $h_2$ (in a system where there are two transmitting antennas and one receiving antenna).

Figure 10:
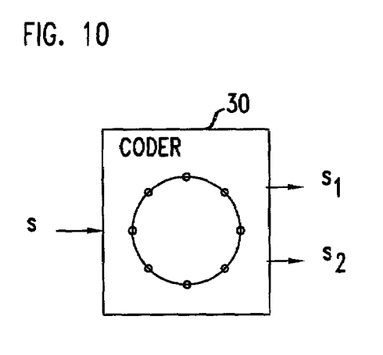
FIG. 10 shows the constellation of an 8-PSK encoder realization for encoder 9.

To illustrate, assume an encoder 30 as depicted in FIG. 10 that employs an 8-PSK constellation of symbols to encode data from a training sequence generator into a sequence s of symbols taken from the set $e^{i2\pi p_k/8}$, $p_k=0,1,2,\ldots,7$, where the training sequences $s_1$ and $s_2$ are algorithmically derived within encoder 30 from sequence s. Specifically assume that $s_1(k)=s(k)$, and that $s_2(k)=(-1)^{p_{k-1}}s(k-1)$, which means that $s_2(k)=s(k-1)$ when $s(k-1)$ is an even member of the constellation ($e^{i0}$, $e^{i\pi/2}$, $e^{i\pi}$, and $e^{i3\pi/2}$), and $s_2(k)=-s(k-1)$ when $s(k-1)$ is an odd member of the constellation.

With such an arrangement, the received signal at time k can be expressed as $$y(k) = \sum_{i=0}^{L-1} h_1(i)s(k-i) + \sum_{i=0}^{L-1} h_2(i,k)(-1)^{p_{k-i-l}}s(k-i-1) + z(k) \quad (23)$$

$$= \sum_{i=0}^{L} h_{eq}(i)s(k-i) + z(k),$$

where $$h_{eq}(i,k) = \begin{cases} h_1(0) & \text{for } i=0 \\ h_1(i) + (-1)^{p_{k-L}} h_2(i-1) & \text{for } 0<i<L \\ (-1)^{p_{k-L}} h_2(L-1) & \text{for } i=L. \end{cases} \quad (24)$$

A block of received signals (corresponding to the useful portion of the training sequence block) can be expressed in matrix form by $$y = S h_{eq} + z \quad (25)$$

where $$S = \begin{bmatrix} s(L) & s(L-1) & \ldots & s(0) \\ s(L+1) & s(L) & \ldots & s(1) \\ \vdots & \vdots & & \vdots \\ s(N_t-1) & s(N_t-2) & \ldots & s(N_t-L-1) \end{bmatrix} \begin{bmatrix} h_{eq}(0,L) \\ h_{eq}(1,L+1) \\ \vdots \\ h_{eq}(L,N_t-1) \end{bmatrix} \quad (26)$$

and following the principles disclosed above, it can be realized that when the training sequence is properly selected so that $S^H S$ is a diagonal matrix, i.e., $S^H S=(N_t-L)I_{L+1}$, an estimate of $h_{eq}$, that is, $\hat{h}_{eq}$, is obtained from $$\hat{h}_{eq} \frac{S^H y}{(N_t-L)}. \quad (27)$$

If the training sequence were to comprise only the even constellation symbols, $e^{i2\pi k/8}$, k=0, 2, 4, 6, per equation (24), the elements of $\hat{h}_{eq}$ would correspond to $$h_{eq}{}^{even}=[h_1(0), h_1(1)+h_2(0), h_1(2)+h_2(1), \ldots h_1(L-1)+h_2(L-2), h_2(L-1)]. \quad (28)$$

If the training sequence were to comprise only the odd constellation symbols, $e^{i2\pi k/8}$, k=1, 3, 5, 7, the elements of $\hat{h}_{eq}$ would correspond to $$h_{eq}{}^{odd}=[h_1(0), h_1(1)-h_2(0), h_1(2)-h_2(1), \ldots h_1(L-1)-h_2(L-2), -h_2(L-1)]. \quad (29)$$

If the training sequence were to comprise a segment of only even constellation symbols followed by only odd constellation symbols (or vice versa), then channel estimator 22 within receiver 20 can determine the $h_{eq}{}^{even}$ coefficients from the segment that transmitted only the even constellation symbols, and can determine the $h_{eq}{}^{odd}$ coefficients from the segment that transmitted only the even constellation symbols. Once both $h_{eq}{}^{even}$ and $h_{eq}{}^{odd}$ are known, estimator 22 can obtain the coefficients of $h_1$ from $$[h_1(0), h_1(1), h_1(2), \ldots h_1(L-1)] = \frac{h_{eq}^{even} + h_{eq}^{odd}}{2} \quad (30)$$

and the coefficients of $h_2$ from $$[h_2(0), h_2(1)h_2(2), \ldots h_2(L-1)] = \frac{h_{eq}^{even} - h_{eq}^{odd}}{2}. \quad (31)$$

What remains, then, is to create a single training sequence s of length $N_t$ where one half of it (the $s_{even}$ portion) consists of only even constellation symbols (even sub-constellation), and another half of it (the $s_{odd}$ portion) consists of only odd constellation symbols (odd sub-constellation). The sequences $s_1$ and $s_2$ of length $N_t$ are derived from the sequence s by means of the 8-PSK space-time trellis encoder. The sequences $s_1$ and $s_2$ must also meet the requirements of equation (8). Once $s_{even}$ is found, $s_{odd}$ can simply be $$s_{odd}=\alpha s_{even}, \text{ where } \alpha=e^{i\pi k/4} \text{ for any } k=1, 3, 5, 7. \quad (32)$$

Therefore, the search for sequence s is reduced from a search in the of $8^{N_t}$ to a search for $s_{even}$ in the space $4^{(N_t/2)}$ such that, when concatenated with $s_{odd}$ that is computed from $s_{even}$ as specified in equation (32), yields a sequence s that has an autocorrelation function that is, or is close to being, impulse-like.

For a training sequence of length $N_t=26$, with an 8-PSK space-time trellis encoder, we have identified the 12 training sequences specified in Table 1 below.

TABLE 1

| sequence # | α | $s_e$ |
|---|---|---|
| 1 | exp(i5π/4) | −1 1 1 1 1 −1 −i −1 1 1 −1 1 1 |
| 2 | exp(i3π/4) | 1 1 −1 1 i i 1 −i i −1 −1 −1 1 |
| 3 | exp(iπ/4) | 1 −1 −1 −i i −i 1 1 1 −i −1 1 1 |
| 4 | exp(iπ/4) | 1 −1 −1 −i 1 −1 1 −i −i −i −1 1 1 |
| 5 | exp(iπ/4) | 1 i 1 1 i −1 −1 i 1 −1 1 i 1 |
| 6 | exp(i3π/4) | 1 i 1 i −1 −1 1 −1 −1 i 1 i 1 |
| 7 | exp(i7π/4) | 1 −i 1 1 −i −1 −1 −1 −i 1 −1 1 −i 1 |
| 8 | exp(i5π/4) | 1 −i 1 −1 i 1 −1 −i 1 1 1 −i 1 |
| 9 | exp(i3π/4) | −1 1 1 1 −1 −1 −i −1 −1 1 1 −1 1 1 |
| 10 | exp(i7π/4) | −1 i −1 −i 1 −i i i 1 i 1 −i 1 |
| 11 | exp(iπ/4) | −1 −i −1 i 1 i −i −i 1 −i 1 i 1 |
| 12 | exp(i3π/4) | −1 −i −1 i −1 i −i −i −1 −i 1 i 1 |

Construction of Training Sequence

While the above-disclosed materials provide a very significant improvement over the prior art, there is still the requirement of selecting a sequence $s_1$ with an impulse-like autocorrelation function. The following discloses one approach for identifying such a sequence without having to perform an exhaustive search.

A root-of-unity sequence with alphabet size N has complex roots of unity elements of the form $$e^{\frac{i2\pi k}{N}}$$

k=1, 2, . . . (N−1). As indicated above, the prior art has shown the perfect roots-of-unity sequences (PRUS) can be found for any training sequence of length $N_t$, as long as no constraint is imposed on the value of N. As also indicated above, however, it is considered disadvantageous to not limit N to a power of 2. Table 2 presents the number of PRUSs that were found to exist (through exhaustive search) for different sequence lengths when the N is restricted to 2 (BPSK), 4 (QPSK), or 8 (8-PSK). Cell entries in Table 2 with "—" indicate that sequence does not exist, and blank cells indicate that an exhaustive search for a sequence was not performed.

TABLE 2

| $N_t =$ | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| BPSK | — | — | 8 | — | — | — | — | — | — | — | — | — | — | — | — | — | — |
| QPSK | 8 | — | 32 | — | — | — | 128 | — | — | — | — | — | — | — | 6144 | — | — |
| 8-PSK | 16 | — | 128 | — | — | — | 512 | — | — | — | — | | | | | | |

A sequence s of length $N_t$ is called L-perfect if the corresponding training matrix S of dimension $(N_t-L+1) \times L$ satisfies equation (8). Thus, an L-perfect sequence of length $N_t$ is optimal for a channel with L taps. It can be shown that the length $N_t$ of an L-perfect sequence from a $2^P$-alphabet can only be equal to $$N_t = \begin{cases} 2(L+i) & \text{for } L = \text{odd} \\ 2(L+i)-1 & \text{for } L = \text{even} \end{cases}, \text{ for } i = 0, 1, \ldots, \quad (33)$$

which is a necessary, but not sufficient, condition for L-perfect sequences of length $N_t$. Table 3 shows the minimum necessary $N_t$ for $L=2,3,\ldots 10$, the size of the corresponding matrix S, and the results of an exhaustive search for L-perfect sequences (indicating the number of such sequences that were found). Cell entries marked "x" indicate that sequences exist, but number of such sequences it is not known.

TABLE 3

| L | 2 | 3 | 4 | 5 | 6 | 7 | 8 | 9 | 10 |
|---|---|---|---|---|---|---|---|---|---|
| $N_t$ | 3 | 6 | 7 | 10 | 11 | 14 | 15 | 18 | 19 |
| S | 2×2 | 4×3 | 4×4 | 6×5 | 6×6 | 8×7 | 8×8 | 10×9 | 10×10 |
| BPSK | 4 | 8 | 8 | — | — | — | — | — | — |
| QPSK | 16 | 64 | 64 | — | — | 128 | | x | |
| 8-PSK | 64 | 512 | 512 | | | x | | x | |

It is known that with a PRUS of a given length, $N_{PRUS}$, one can estimate up to $L=N_{PRUS}$ unknowns. It can be shown that a training sequence of length $N_t$ is also an L-perfect training sequence if $$N_t = kN_{PRUS}+L-1 \text{ and } k \geq 1. \quad (34)$$

Accordingly, an L-perfect sequence of length $kN_{PRUS}+L-1$ can be constructed by selecting an $N_{PRUS}$ sequence, repeating it k times, and circularly extending it by L−1 symbols. Restated and amplified somewhat, for a selected PRUS of a given $N_{PRUS}$, i.e., $$s_p(N_{PRUS}) = [s_p(0) \, s_p(1) \ldots s_p(N_{PRUS}-1)], \quad (35)$$

the L-perfect sequence of length $kN_{PRUS}+L-1$ is created from a concatenation of k $s_p(N_{PRUS})$ sequences followed by the first L−1 symbols of $s_p(N_{PRUS})$, or from a concatenation of the last L−1 symbols of $s_p(N_{PRUS})$ followed by k $s_p(N_{PRUS})$ sequences.

Figure 11:
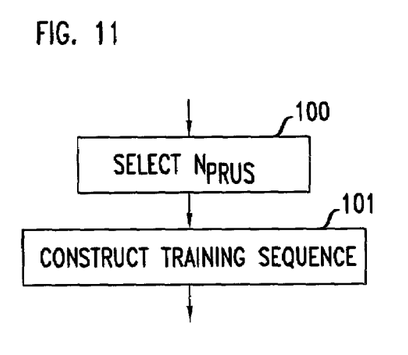
FIG. 11 presents a flow diagram for designing L-perfect sequences.

FIG. 11 shows the simplicity of this method. In step 100 an $N_{PURS}$ sequence is selected in response to an applied training sequence length $N_t$ (that is greater than nL−1, where n is the number of transmitter antennas). Control then passes to step 101 where the training sequence is constructed, as indicated above, from concatenation of k of the selected $N_{PRUS}$ sequence followed by the first L−1 symbols of $s_p(N_{PRUS})$, or from a concatenation of the last L−1 symbols of the selected $N_{PRUS}$ sequence followed by k concatenated sequences.

To illustrate, assume that the number of channel "taps" that need to be estimated, L, is 5, and that a QPSK alphabet is desired to be used. From the above it is known that $N_{PRUS}$ must be equal to or greater than 5, and from Table 2 it is known that the smallest $N_{PRUS}$ that can be found for QSPK that is larger than 5 is $N_{PRUS}=8$. Employing equation (34) yields $$N_t = kN_{PRUS}+L-1$$

$$= k \cdot 8+5-1$$

$$= 12, 20, 28, \ldots \text{ for } k=1, 2, 3 \ldots \quad (36)$$

While an L-perfect training sequence cannot be constructed from PRUS sequences for values of $N_t$ other than values derived by operation of equation (34), it is known that, nevertheless, L-perfect sequences may exist. The only problem is that it may be prohibitively difficult to find them. However, in accordance with the approach disclosed below, sub-optimal solutions are possible to create quite easily.

If it is given that the training sequence is $N_t$ long, one can express this length by $$N_t = kN_{PRUS}+L-1+M, \text{ where } M>0 \quad (37)$$

In accord with our approach, select a value of $N_{PRUS} \geq L$ that minimizes M, create a sequence of length $kN_{PRUS}+L-1$ as disclosed above, and then extend that sequence by adding M symbols. The M added symbols can be found by selecting, through an exhaustive search, the symbols that lead to the lowest estimation MSE. Alternatively, select a value of $N_{PRUS} \geq L$ that minimizes M' in the equation, $$N_t = kN_{PRUS}+L-1-M', \text{ where } M'>0 \quad (38)$$

create a sequence of length $kN_{PRUS}+L-1$ as disclosed above, and then drop the last (or first) M' symbols.

The receiver shown in FIG. 2 includes the channel estimator 22, which takes the received signal and multiplies it $S^H$ as appropriate; see equation (12), above.

We claim:

1. A space-time diversity transmitter that includes (a) n transmitting antennas, where n is greater than one, (b) an encoder of an applied information stream, said encoder developing n symbol streams, and (c) a constellation mapper responsive to said n symbol streams, for mapping symbols of each of said n symbol streams into a standard signal constellation to create a mapped stream, said constellation mapper applying each of the created n mapped streams to a different one of said n transmitting antennas, the improvement comprising:

a generator of a symbols sequence, s;

an encoder for creating n training sequences from said symbols sequence, where each of the created n training sequences has an impulse-like autocorrelation function and zero cross correlation relative to the other of the n created training sequences; and a training sequence mapper that maps said n training sequences onto a standard constellation to develop n mapped training sequences, and applies the n mapped training sequences to said n antennas wherein said n training sequences are of length $N_t \geq 2L-1$, and $N_t = kN_{PRUS}+L-1$, where L is an integer corresponding to a number of channel parameter unknowns that need to be estimated through which channel said transmitter communicates with a receiver, k is an integer greater than or equal to 1, and $N_{PRUS}$ is a length of a perfect roots-of-unity sequence of length N.

2. A method for developing a training sequence of length, $N_t$, for estimating L channel parameter unknowns that need to be estimated comprising the steps of:

selecting a Perfect Roots-of-Unity Sequences (PRUS) of length $N_{PRUS}$ equal to or greater than L, and constructing said training sequence by forming a sequence of length $N_t = kN_{PRUS}+L-1$ where k is an integer that is equal to or greater than 1.

3. The method of claim 2 where said step of constructing concatenates k instances of said selected PRUS of length $N_{PRUS}$ forming a subsequence, and forming said training sequence by appending to said subsequence L−1 initial members of said PRUS of length $N_{PRUS}$.

4. The method of claim 2 where said step of constructing concatenates k instances of said selected PRUS of length $N_{PRUS}$ forming a subsequence, and forming said training sequence by appending to said subsequence L−1 terminal members of said PRUS of length $N_{PRUS}$ to said subsequence.

5. A method for developing a training sequence of length $N_t$ for estimating L channel unknowns comprising the steps of:

selecting a Perfect Roots-of-Unity Sequence (PRUS) of length $N_{PRUS}$ equal to or greater than L, selecting an integer $k \geq 1$ such that integer M in equation $N_t = kN_{PRUS}+L-1+M$ is equal to, or greater than, 0; and forming said training sequence from a combining a first subsequence composed of k instances of said PRUS of length $N_{PRUS}$, a second subsequence composed of L−1 initial, or terminal members of said PRUS of length $N_{PRUS}$, and a third subsequence composed of M symbols.

6. The method of claim 5 where said PRUS is selected to minimize M.

7. The method of claim 5 where said M symbols are chosen based on a search that minimizes a preselected error criterion.

8. The method of claim 5 where said combining of said first subsequence and said second subsequence, when said second subsequences is composed of L−1 initial members of said PRUS of length $N_{PRUS}$, comprises said first subsequence followed by said second subsequence.

9. The method of claim 5 where said combining of said first subsequence and said second subsequence, when said second subsequences is composed of L−1 terminal members of said PRUS of length $N_{PRUS}$, comprises said second subsequence followed by said first subsequence.

* * * * *